United States Patent
Zhou

(10) Patent No.: US 8,756,584 B2
(45) Date of Patent: Jun. 17, 2014

(54) CODE INSTRUMENTATION METHOD AND CODE INSTRUMENTATION APPARATUS

(75) Inventor: Wu Zhou, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/411,547

(22) Filed: Mar. 26, 2009

(65) Prior Publication Data
US 2009/0249304 A1    Oct. 1, 2009

(30) Foreign Application Priority Data

Mar. 26, 2008   (CN) .......................... 2008 1 0084086

(51) Int. Cl.
G06F 9/44    (2006.01)
(52) U.S. Cl.
USPC ............ 717/130; 717/124; 717/127; 717/129
(58) Field of Classification Search
None
See application file for complete search history.

(56) References Cited

U.S. PATENT DOCUMENTS

| | | | | | |
|---|---|---|---|---|---|
| 5,689,712 | A | * | 11/1997 | Heisch ........................... | 717/130 |
| 5,854,933 | A | * | 12/1998 | Chang ............................ | 717/158 |
| 5,909,577 | A | * | 6/1999 | Devanbu ........................ | 717/127 |
| 5,960,198 | A | * | 9/1999 | Roediger et al. ............... | 717/130 |
| 5,999,737 | A | | 12/1999 | Srivastava | |
| 6,049,666 | A | * | 4/2000 | Bennett et al. ................. | 717/130 |
| 6,088,525 | A | * | 7/2000 | Peri ................................ | 717/150 |
| 6,332,214 | B1 | * | 12/2001 | Wu ................................ | 717/141 |
| 6,728,949 | B1 | * | 4/2004 | Bryant et al. .................. | 717/127 |
| 6,934,935 | B1 | * | 8/2005 | Bennett et al. ................. | 717/127 |
| 7,698,692 | B1 | * | 4/2010 | Garud et al. ................... | 717/130 |
| 8,037,459 | B2 | * | 10/2011 | Mavinakayanahalli et al. ............................. | 717/129 |
| 2001/0044931 | A1 | * | 11/2001 | Kyushima et al. ............. | 717/9 |
| 2002/0073402 | A1 | * | 6/2002 | Sangavarapu et al. ........ | 717/129 |
| 2002/0095661 | A1 | * | 7/2002 | Angel et al. ................... | 717/130 |
| 2002/0104074 | A1 | * | 8/2002 | Hundt et al. ................... | 717/129 |
| 2003/0084433 | A1 | * | 5/2003 | Luk et al. ....................... | 717/158 |
| 2004/0003375 | A1 | * | 1/2004 | George et al. ................. | 717/124 |
| 2004/0103401 | A1 | * | 5/2004 | Chilimbi et al. ............... | 717/130 |
| 2005/0251790 | A1 | * | 11/2005 | Hundt ............................ | 717/130 |
| 2007/0006159 | A1 | * | 1/2007 | Hecht et al. ................... | 717/124 |
| 2009/0007077 | A1 | * | 1/2009 | Musuvathi et al. ............ | 717/130 |

OTHER PUBLICATIONS

Josef Weidendorfer et al., A Tool Suite for Simulation Based Analysis of Memory Access Behavior, 2004 ICCS, pp. 440-447, <http://link.springer.com/chapter/10.1007/978-3-540-24688-6_58>.*

Luddy Harrison et al., Examination of a memory access classification scheme for pointer-intensive and numeric programs, 1996 ACM, pp. 133-140, <http://dl.acm.org/citation.cfm?id=237595>.*

(Continued)

*Primary Examiner* — Thuy Dao
*Assistant Examiner* — Cuong V Luu
(74) *Attorney, Agent, or Firm* — Jordan IP Law, LLC

(57) ABSTRACT

A code instrumentation method and a code instrumentation apparatus for instrumenting object codes of programs to enable memory access tracing. The code instrumentation method includes: identifying an object code block to be executed circularly in object codes; identifying at least one memory access instruction in the object code block where a memory address to be accessed during the circular execution of the object code block keeps unchanged; and inserting a routine for tracing the memory access to be executed by the at least one memory access instruction outside the object code block.

5 Claims, 5 Drawing Sheets

(56) References Cited

OTHER PUBLICATIONS

Aamer Jaleel et al., CMP$im A Binary Instrumentation Approach to Modeling Memory Behavior of Workloads on CMPs, 2006 Citeseer, 10 pages, <http://citeseerx.ist.psu.edu/viewdoc/download?doi=10.1.1.94.7011&rep=repl&type=pdf>.*

Aaron J. Goldberg et al., Mtool an Integrated System for Performance Debugging Shared Memory Multiprocessor Applications, 1993 IEEE, pp. 28-40, <http://ieeexplore.ieee.org/stamp/stamp.jsp?tp=&arnumber=205651>.*

Trishul M. Chilimbi et al., Low-Overhead Memory Leak Detection Using Adaptive Statistical Profiling, 2006 ACM, pp. 156-164, <http://dl.acm.org/citation.cfm?id=1024393>.*

Michael D. Bond et al., Tolerating Memory Leaks, 2008 ACM, pp. 109-125, <http://dl.acm.org/citation.cfm?id=1449764>.*

Allan Snavely et al., Modeling Application Performance by Convolving Machine Signatures with Application Profiles, 2001 IEEE, pp. 149-156, <http://ieeexplore.ieee.org/stamp/stamp.jsp?tp=&arnumber=990754>.*

Ben L. Titzer et al., Nonintrusive Precision Instrumentation of Microcontroller Software, 2005 ACM, pp. 59-68, <http://dl.acm.org/citation.cfm?id=1065919>.*

David K. Poulse et al., Data Prefetching and Data Forwarding in Shared Memory Multiprocessors, 1994 IEEE, pp. 276-280, <http://ieeexplore.ieee.org/stamp/stamp.jsp?tp=&arnumber=4115793>.*

W. Chen et al., Using Profile Information to Assist Advanced Compiler Optimization and Scheduling, pp. 31-48, 1993 Springer, <http://link.springer.com/chapter/10.1007/3-540-57502-2_38>.*

Trishul M. Chilimbi et al., Using Generational Garbage Collection to Implement Cache-Conscious Data Placement, 1998 ACM, pp. 37-48, <http://dl.acm.org/citation.cfm?id=286865>.*

Erik Berg et al., SIP: Performance Tuning through Source Code Interdependence, 2002 Springer, pp. 177-186, <http://link.springer.com/chapter/10.1007/3-540-45706-2_22>.*

Hollingsworth, Jeffrey K. et al., "MDL: A Language and Compiler for Dynamic Program Instrumentation," PACT '97 Proceedings of the 1997 International Conference on Parallel Architectures and Compilation Techniques, 1997, 12 pages, Washington, DC.

* cited by examiner

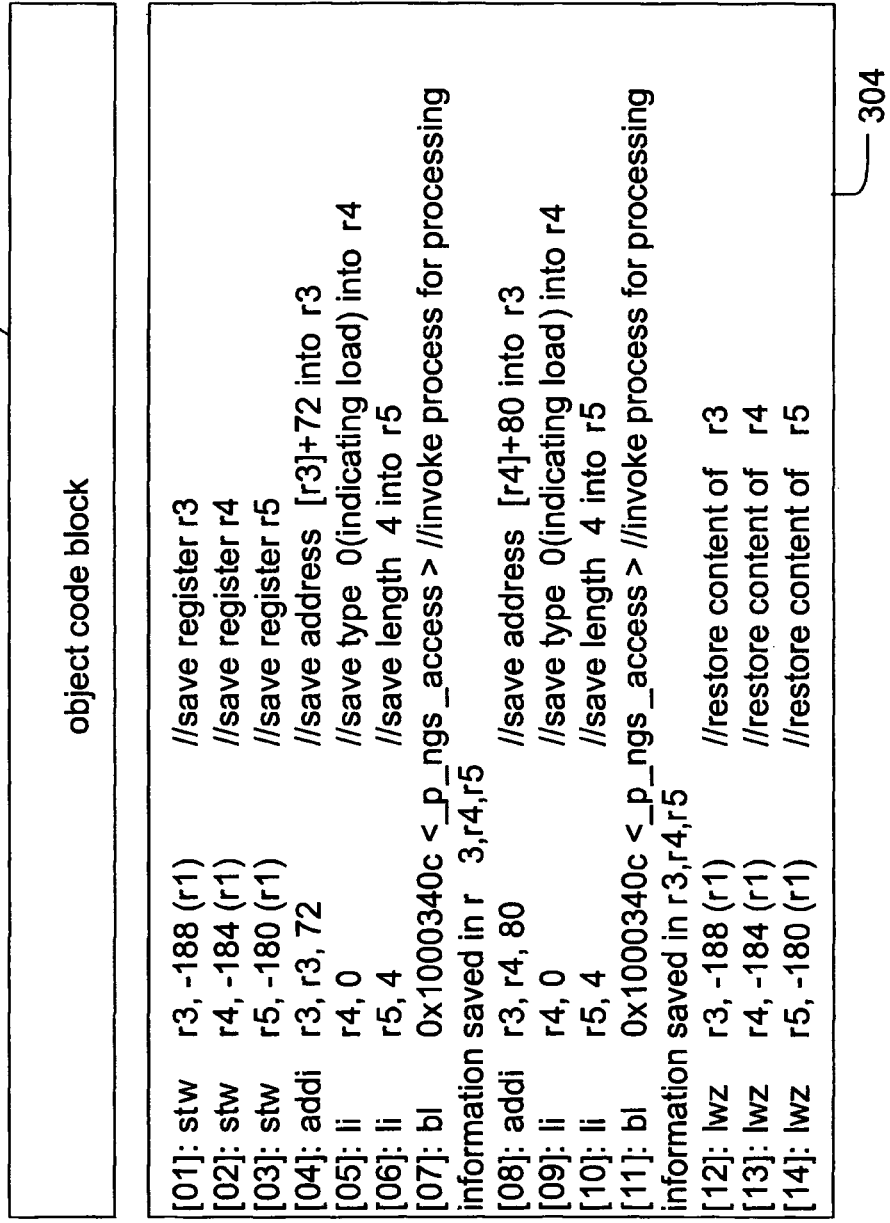

FIG. 3B

| | object code block |
|---|---|
| [01]: stw r3, -188 (r1) | //save register r3 |
| [02]: stw r4, -184 (r1) | //save register r4 |
| [03]: stw r5, -180 (r1) | //save register r5 |
| [04]: addi r3, 72 | //save address [r3]+72 into r3 |
| [05]: li r4, 0 | //save type 0(indicating load) into r4 |
| [06]: li r5, 4 | //save length 4 into r5 |
| [07]: bl 0x1000340c <_p_ngs_access> | //invoke process for processing information saved in r 3,r4,r5 |
| [08]: addi r3, r4, 80 | //save address [r4]+80 into r3 |
| [09]: li r4, 0 | //save type 0(indicating load) into r4 |
| [10]: li r5, 4 | //save length 4 into r5 |
| [11]: bl 0x1000340c <_p_ngs_access> | //invoke process for processing information saved in r3,r4,r5 |
| [12]: lwz r3, -188 (r1) | //restore content of r3 |
| [13]: lwz r4, -184 (r1) | //restore content of r4 |
| [14]: lwz r5, -180 (r1) | //restore content of r5 |

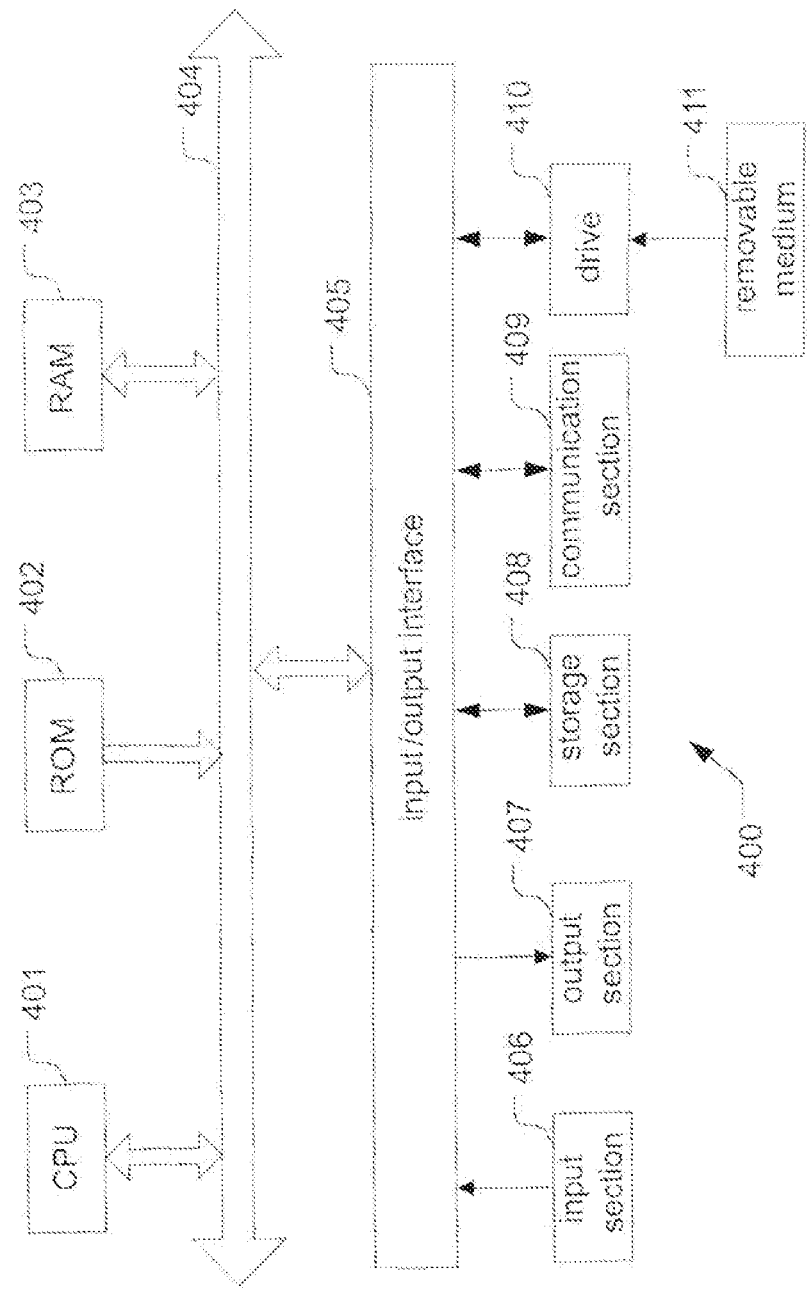

CODE INSTRUMENTATION METHOD AND CODE INSTRUMENTATION APPARATUS

FIELD OF THE INVENTION

The present invention relates to computer software testing and debugging technique, and especially relates to a code instrumentation method and code instrumentation apparatus for instrumenting object codes of a program to enable memory access tracing.

BACKGROUND OF THE INVENTION

Memory access tracing is an important technique in the field of computer software testing and debugging. For example, memory access tracing is useful for memory leakage detecting, data race detecting and the like.

In order to provide memory access tracing, it is generally necessary to instrument computer program code (for example, source codes, object codes or the like). This is done, for example, by adding routines or instructions for obtaining and recording information, such as, target address (the address which is written into), length of written data, visit type (for example, load or store), thread identification and so on, about memory access instructions (for example, instructions for writing into the memory), or instructions for invoking these routines or instructions, before or after the memory access instructions.

As compared to program codes without such instrumentation, the instrumented program codes have an additional overhead for memory access tracing, especially in the case that the program codes include more memory access instructions or the memory access instructions are executed in a large number of times.

Therefore, there is needed a technique for providing memory access tracing while reducing such overhead.

SUMMARY OF THE INVENTION

An object of the present invention is to provide a code instrumentation method and a code instrumentation apparatus for instrumenting object codes of a program to enable memory access tracing, so as to reduce the overhead for memory access tracing.

An embodiment of the present invention provides a code instrumentation method for instrumenting object codes of a program to enable memory access tracing, comprising: identifying an object code block to be executed circularly in the object codes; identifying at least one memory access instruction in the object code block where a memory address to be accessed during the circular execution of the object code block remains unchanged; and inserting a routine for tracing the memory access to be executed by the at least one memory access instruction outside the object code block.

An embodiment of the present invention also provides a code instrumentation apparatus for instrumenting object codes of a program to enable memory access tracing, comprising: a loop identifying device configured for identifying an object code block to be executed circularly in the object codes; an instruction identifying device configured for identifying at least one memory access instruction in the object code block where a memory address to be accessed during the circular execution of the object code block remains unchanged; and an inserting device configured for inserting a routine for tracing the memory access to be executed by the at least one memory access instruction outside the object code block.

According to the embodiments of the present invention, for memory access instructions executed in a loop, the tracing instructions corresponding to them are arranged outside the loop, instead of inside the loop, reducing the number of times for running the tracing instructions and making it possible to trace the accessed memory addresses.

BRIEF DESCRIPTION OF THE DRAWINGS

The above and/or other aspects, features and/or advantages of the present invention will be easily appreciated in view of the following description by referring to the accompanying figures. In the accompanying drawings, identical or corresponding technical features or components will be represented with identical or corresponding reference numbers.

FIGS. 3A and 3B are diagrams showing the routines inserted by an inserting device.

FIG. 4 is a block diagram showing a sample structure of a computer for implementing the present invention according to an embodiment of the present invention.

DETAILED DESCRIPTION

Figure 1:
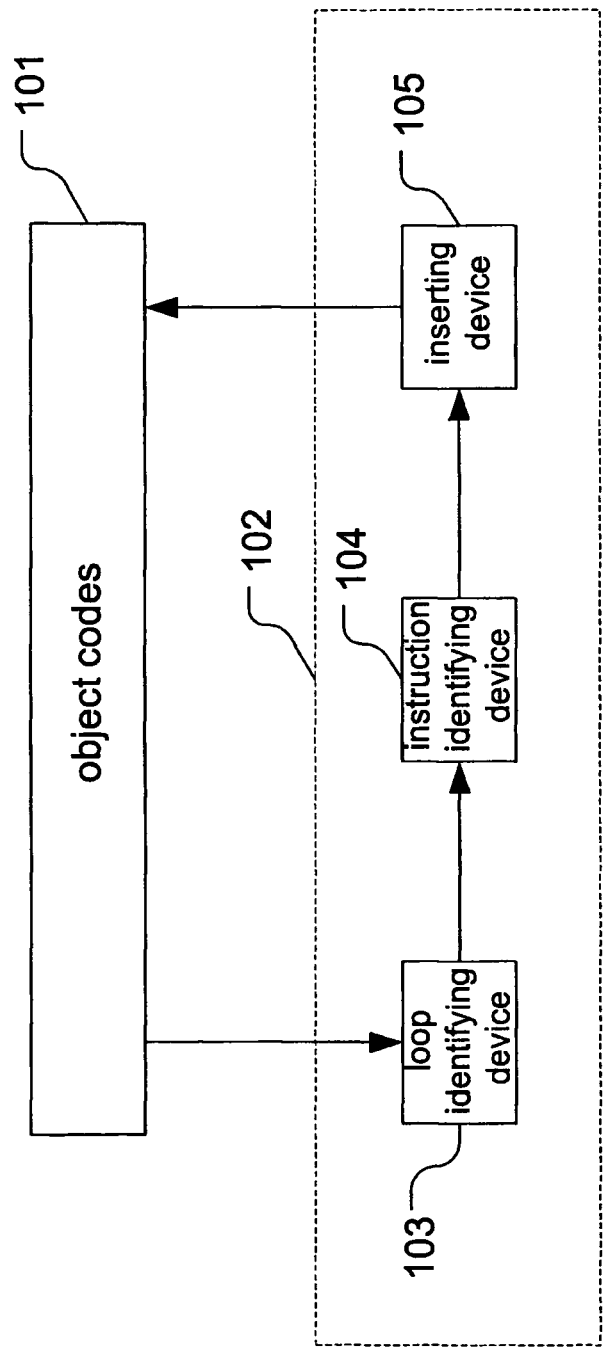
FIG. 1 is a block diagram showing the structure of a code instrumentation apparatus according to an embodiment of the present invention.

Embodiments of the present invention are described below with reference to the drawings. It is to be noted that, for purpose of clarity, representations and descriptions about those components and processes known by those skilled in the art but unrelated to the present invention are omitted in the drawings and the description.

FIG. 1 is a block diagram showing the structure of a code instrumentation apparatus 102 according to an embodiment of the present invention. As shown in FIG. 1, the code instrumentation apparatus 102 includes a loop identifying device 103, an instruction identifying device 104 and an inserting device 105. The loop identifying device 103 identifies an object code block to be executed circularly in the object codes. The instruction identifying device 104 identifies one or more memory access instructions in the object code block where memory addresses to be accessed remain unchanged. The inserting device 105 inserts routines for tracing the memory accesses to be executed by the memory access instructions outside the object code block.

Object codes 101 may be for example a binary executable program. The object codes 101 may include code segments. The code segments are composed of executable instructions. Each instruction has a certain format. It is possible to determine type, operand, addressing mode and the like of an instruction based on the information included in the instruction. For example, operation codes, source registers, target registers and other information may be specified in the instruction format, and it is possible to determine whether an instruction is a memory access instruction (for example, a load instruction and a store instruction) based on the operation code.

The addressing mode refers to the manner for forming addresses of the source and target operands. Examples of addressing modes relating to memory access include but are not limited to: direct addressing, in which operands are in the memory, and instructions directly include the memory addresses of the operands; register indirect addressing, in which operands are in the memory, and the memory addresses of the operands are in registers; register relative addressing, in which operands are in the memory, and the memory address of each operand is the sum of the content in the register and an offset; base-plus-index addressing, in which operands are in the memory, and the memory address of each operand is the sum of the content of a base register and the content of an index register; and base relative-plus-index addressing, in which operands are in the memory, and the memory address of each operand is the sum of the content of a base register, the content of an index register and an offset.

Operations of portions of the code instrumentation apparatus 102 as shown in FIG. 1 will be described in connection with FIG. 2.

Figure 2:
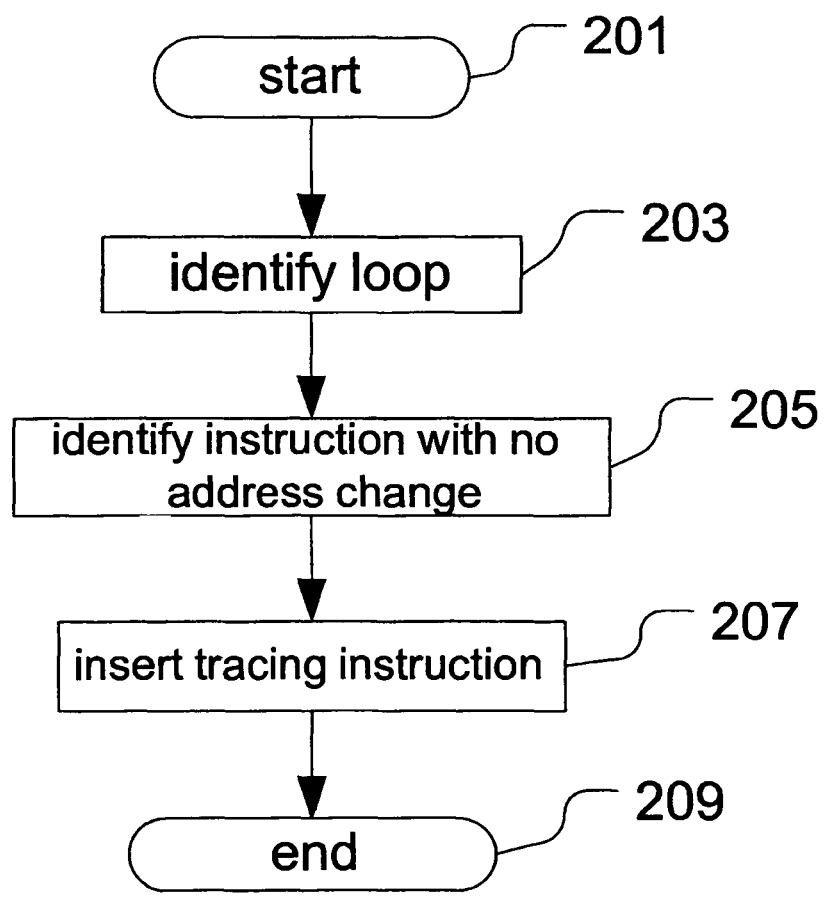
FIG. 2 is a flow chart showing a code instrumentation method according to an embodiment of the present invention.

FIG. 2 is a flow chart showing a code instrumentation method according to an embodiment of the present invention. As shown in FIG. 2, the method starts at step 201. At step 203, the loop identifying device 103 identifies loops in the object codes 101, i.e., object code blocks to be circularly executed when a condition is satisfied. Such object code blocks may be identified by using available techniques.

Then, at step 205, for each object code block identified by the loop identifying device 103, the instruction identifying device 104 identifies memory access instructions in the object code block where the memory addresses to be accessed during the circular execution of the object code block remains unchanged. For example, the instruction identifying device 104 determines whether or not the instructions in the object code block are memory access instructions, one by one. If an instruction is a memory access instruction, it is determined whether there is any instruction in the object code block, which will modify the operand address in the memory access instruction. If there is no instruction that will modify the operand address, the instruction identifying device 104 identifies the memory access instruction as one where the memory addresses to be accessed during the circular execution of the object code block remains unchanged (step 205).

The method for judging whether an operand address will be modified depends on the addressing mode of the operand. For various addressing modes, it is possible to treat the operand address as the calculation result of an arithmetic expression. For example, for the register relative addressing, the arithmetic expression is "content of register+offset amount". If the arithmetic expression contains no variable (for example, register) or all the variables in the arithmetic expression keep unchanged during the execution of the object code block (i.e., there is no instruction for modifying these variables in the object code block), it is considered that the operand address remains unchanged during the execution of the object code block.

In addition or alternatively, depending on the purpose of tracing, the instruction identifying device 104 may be configured to identify those memory access instructions which use a specific addressing mode. Generally, the specific addressing mode includes one or more of direct addressing, register indirect addressing, register relative addressing, base-plus-index addressing and base relative-plus-index addressing.

In addition or alternatively, depending on the purpose of tracing, the instruction identifying device 104 may be configured to identify those memory access instructions having a specific accessing type, for example, instructions for reading memory, instructions for writing memory or instruction for reading and writing memory.

Then, at step 207, the inserting device 105 inserts routines for tracing the memory accesses of the memory access instructions identified by the instruction identifying device 104 outside the object code block.

Figure 3A:
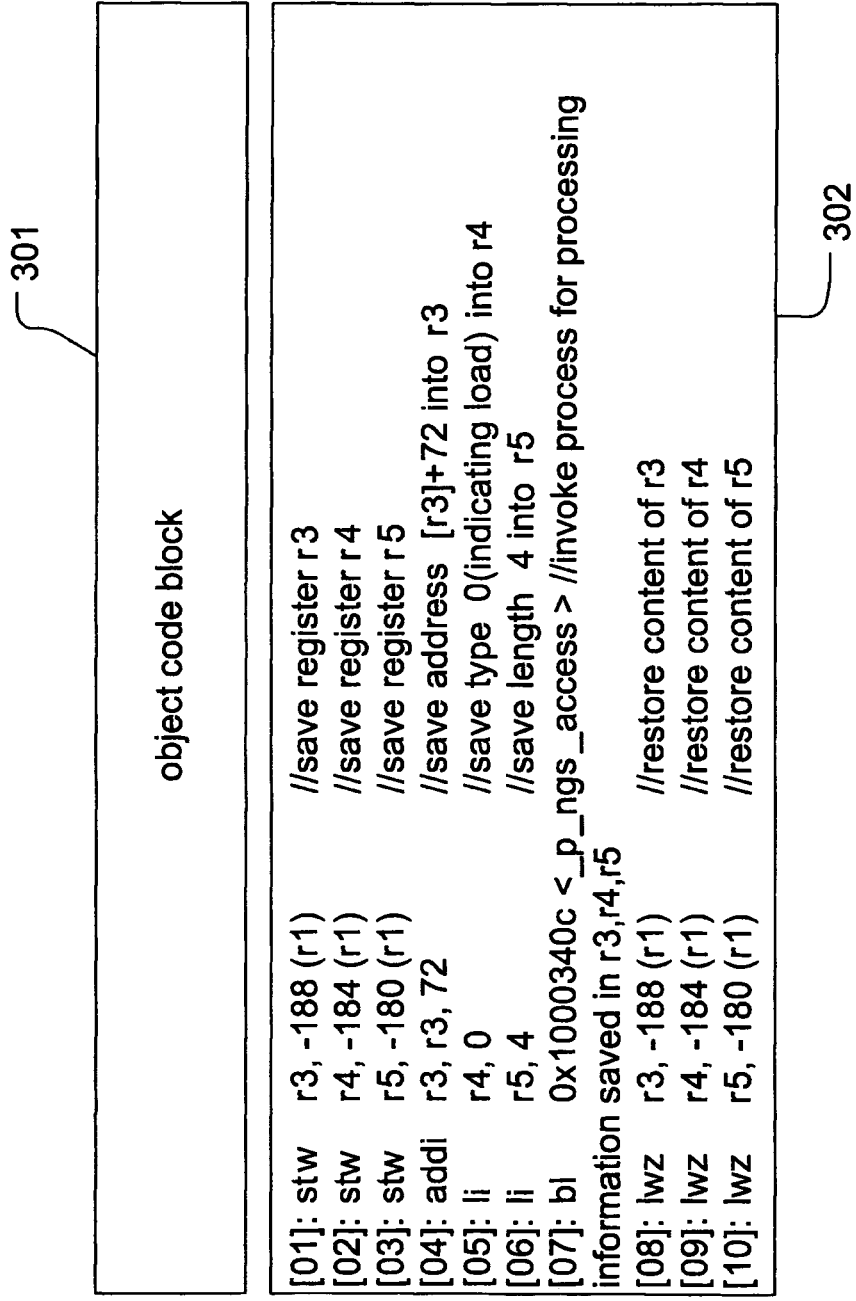

FIG. 3A shows an example of the routine inserted by the inserting device 105. As shown in FIG. 3A, it is assumed that the instruction identifying device 104 has identified an instruction "lwz r3, 72 (r3)" in an object code block 301, which is used to load a word in the memory cell at an address of the content of register r3 plus 72 (i.e., [r3]+72) into register r3. The operand address [r3]+72 of the instruction remains unchanged during the execution of the object code block 301 where the instruction is located. For this instruction, the inserting device 105 may insert a tracing routine 302 after the object code block 301. Of course, the tracing routine 302 may also be inserted before the object code block 301.

As shown in FIG. 3A, the tracing routine 302 may include three portions. The first portion includes instructions [01]-[03] for saving initial values of three registers r3, r4, r5 that will be used by the routine. Generally, for the portion of context that may be changed by the execution of the routine, it is necessary to provide, at the start of the routine, instruction for saving present execution context that occurs before the start of the routine, i.e., at the position where the routine is inserted. The second portion includes instructions [04]-[07] for recording type, reading length and reading address information of memory access instruction "lwz r3, 72 (r3)" in the object code block 301. Generally, it is possible to determine the information to be recorded about memory accesses according to the tracing requirements. The third portion includes instructions [08]-[10] for restoring the initial values of three register r3, r4, r5 that will be used by the routine. Generally, this portion of instructions is for purpose of restoring the saved present execution context.

Returning to FIG. 2, the method ends at step 209.

In a preferable embodiment, the loop identifying device 103 may further identify smaller object code blocks to be circularly executed in the identified object code blocks. The instruction identifying device 104 is configured for performing its process on each loop identified by the loop identifying device 103.

In a sample embodiment, the inserting device 105 may be configured, with respect to at least two memory access instructions identified from the same object code block, to insert instructions for saving the present execution context that occurs at the inserting position, insert instructions for recording information required for tracing the memory accesses to be executed by these memory access instructions, and insert instructions for restoring the saved present execution context. FIG. 3B shows an example of the routine inserted by the inserting device 105 in the above case. As shown in FIG. 3B, it is assumed that the instruction identifying device 104 has identified two instructions "lwz r3, 72 (r3)" and "lwz r4, 80 (r4)" from an object code block 303, respectively for loading a word in the memory cell at an address of the content of register r3 plus 72 (i.e., [r3]+72) into register r3, and for loading a word in the memory cell at an address of the content of register r4 plus 80 (i.e., [r4]+80) into register r4. The operand addresses [r3]+72 and [r4]+80 of these two instructions remain unchanged during the execution of the object code block 303 where they are located. For these two instructions, the inserting device 105 may insert a tracing routine 304 after the object code block 303.

As shown in FIG. 3B, the tracing routine 302 may include three portions. The first portion includes instructions [01]-[03] for saving the context, that is, initial values of three registers r3, r4, r5 that will be used by the routine. The second portion includes instructions [04]-[11] for recording memory access related information of memory access instructions "lwz r3, 72 (r3)" and "lwz r4, 80 (r4)" in the object code block 303. The third portion includes instructions [12]-[14] for restoring the saved context.

In another sample embodiment, the memory addresses to be accessed in the above at least two memory access instructions are addressed by using the same register. In addition or alternatively, the tracing routine for the above at least two memory access instructions may be optimized to share registers as far as possible, so as to reduce the load for protecting and restoring the context.

Although the present invention has been described for application in the field of computer software testing and debugging in the above description, the present invention is also applicable for other fields where memory access tracing is needed, for example, architecture design and performance optimization. For example, the present invention may be applicable for simulators widely used in architecture design to perform memory access tracing. Also, the present invention may also be applicable for performance profile driven optimization techniques, to perform memory access tracing to provide memory performance analysis data.

The above processes, devices and processing modules may be implemented through a single processing device or a plurality of processing devices. Such a processing device may be a microprocessor, microcontroller, digital processor, microcomputer, a portion of the central processing unit, a state machine, logic circuitry, and/or any device that manipulates the signal.

In addition, it should be noted that, the above-described series of processes may be implemented by either software or firmware. In the case where the above-described series of processes are implemented by the software, a program that constitutes the software is installed from a storage medium or a network into a computer having a dedicated hardware configuration, e.g., a general-purpose personal computer 400 as illustrated in FIG. 4, that when various programs are installed therein, becomes capable of performing various functions, or the like.

In FIG. 4, a central processing unit (CPU) 401 performs various processes in accordance with a program stored in a read only memory (ROM) 402 or a program loaded from a storage section 408 to a random access memory (RAM) 403. Data required when the CPU 401 performs the various processes or the like is also stored as required in the RAM 403.

The CPU 401, the ROM 402 and the RAM 403 are connected to one another via a bus 404. An input/output interface 405 may also be connected to the bus 404.

Additional components may be connected to the input/output interface 405, including: an input section 406 including a keyboard, a mouse, or the like; an output section 407 including a display such as a cathode ray tube (CRT), a liquid crystal display (LCD), or the like, and a loudspeaker or the like. The storage section 408 may comprise a hard disk or the like. A communication section 409 may also be connected to the bus 404 and may include a network interface card such as a LAN card, a modem, or the like. The communication section 409 performs a communication process via the network such as the internet.

A drive 410 may also be connected to the input/output interface 405. A removable medium 411, such as a magnetic disk, an optical disk, a magneto-optical disk, a semiconductor memory, or the like, may be mounted on the drive 410, so that a computer program read therefrom may be installed into the storage section 408.

According to a sample embodiment the above-described series of processes are implemented by software. The program that constitutes the software may be installed from the network such as the internet or from a storage medium such as the removable medium 411 or another computer-readable storage medium.

One skilled in the art should note that, this storage medium is not limit to the removable medium 411 having the program stored therein as illustrated in FIG. 4, which is delivered separately from the device for providing the program to the user. Examples of the removable medium 411 include the magnetic disk (including a floppy disk), the optical disk (including a compact disk-read only memory (CD-ROM) and a digital versatile disk (DVD)), the magneto-optical disk (including a mini-disk (MD)), and the semiconductor memory. Alternatively, the storage medium may be the ROM 402, the hard disk contained in the storage section 408, or the like, which have the program stored therein and is deliver to the user together with the device that containing them.

It should also be noted that the step in which the above-described series of processes are performed may naturally be performed chronologically in order of description but need not be performed chronologically. Some steps may be performed in parallel or independently of one another.

Although illustrative embodiments have been described herein, it should be understood that various other changes, replacements and modifications may be affected therein by one skilled in the art without departing from the scope or spirit of the invention. Furthermore, the present application is not limited to the above-described specific embodiments for processes, devices, manufactures, means, methods and steps. One skilled in the art will understand from the disclosure of the present invention that, according to the present invention, it is possible to use existing processes, devices, manufactures, means, methods or steps and those to be developed in the future which perform substantially the same functions with the above-described embodiments or obtain substantially the same results. Therefore, the appended claims are intended to cover in their scopes such processes, devices, manufactures, means, methods or steps.

I claim:

1. A processor-implemented code instrumentation method for instrumenting object codes of a program to enable memory access tracing, comprising:

identifying an object code block to be executed circularly in the object codes;

identifying, without modifying said object code block, at least one memory access instruction in the object code block where a memory address to be accessed during the circular execution of the object code block remains unchanged;

inserting a routine for tracing the memory access to be executed by the at least one memory access instruction outside the object code block without modifying said object code block;

wherein the at least one memory access instruction comprises at least two memory access instructions;

wherein the memory address to be accessed by the at least one memory access instruction is addressed by using the same register;

wherein addressing mode for the memory address to be accessed by the at least one memory access instruction comprises one or more of direct addressing, register indirect addressing, register relative addressing, base-plus-index addressing and base relative-plus-index addressing; and wherein the inserting comprising inserting an instruction for saving the present execution context that occurs at the inserting position; inserting an instruction for recording information required for tracing the memory access to be executed by the at least one memory access instruction; and inserting an instruction for restoring the saved present execution context.

2. The code instrumentation method of claim 1, wherein the routine is inserted after the object code block.

3. A code instrumentation apparatus having a processor for instrumenting object codes of a program to enable memory access tracing, comprising:
- a loop identifying device configured for identifying an object code block, without modifying said object code block, to be executed circularly in the object codes;
- an instruction identifying device configured for identifying at least one memory access instruction in the object code block where a memory address to be accessed during the circular execution of the object code block remains unchanged;
- an inserting device configured for inserting a routine for tracing the memory access to be executed by the at least one memory access instruction outside the object code block without modifying said object code block;
- wherein the at least one memory access instruction comprises at least two memory access instructions;
- wherein the memory address to be accessed by the at least one memory access instruction is addressed by using the same register;
- wherein addressing mode for the memory address to be accessed by the at least one memory access instruction comprises one or more of direct addressing, register indirect addressing, register relative addressing, base-plus-index addressing and base relative-plus-index addressing; and
- wherein the inserting comprising inserting an instruction for saving the present execution context that occurs at the inserting position; inserting an instruction for recording information required for tracing the memory access to be executed by the at least one memory access instruction; and inserting an instruction for restoring the saved present execution context.

4. The code instrumentation apparatus of claim 3, wherein the inserting device is further configured for inserting the routine after the object code block.

5. A program product comprising a non-transitory computer-readable medium having encoded thereon computer-executable instructions for:
- identifying an object code block, without modifying said object code block, to be executed circularly in the object codes;
- identifying at least one memory access instruction in the object code block where a memory address to be accessed during the circular execution of the object code block remains unchanged;
- inserting a routine for tracing the memory access to be executed by the at least one memory access instruction outside the object code block without modifying said object code block;
- wherein the at least one memory access instruction comprises at least two memory access instructions;
- wherein the memory address to be accessed by the at least one memory access instruction is addressed by using the same register;
- wherein addressing mode for the memory address to be accessed by the at least one memory access instruction comprises one or more of direct addressing, register indirect addressing, register relative addressing, base-plus-index addressing and base relative-plus-index addressing; and
- wherein the inserting comprising inserting an instruction for saving the present execution context that occurs at the inserting position; inserting an instruction for recording information required for tracing the memory access to be executed by the at least one memory access instruction; and inserting an instruction for restoring the saved present execution context.

* * * * *